United States Patent [19]

Hashimoto

[11] 4,162,047
[45] Jul. 24, 1979

[54] HUB FOR USE IN A TAPE CASETTE

[75] Inventor: Noritsugu Hashimoto, Takaoka, Japan

[73] Assignee: Hitachi Maxell, Ltd., Osaka, Japan

[21] Appl. No.: 878,727

[22] Filed: Feb. 17, 1978

[30] Foreign Application Priority Data

Feb. 18, 1977 [JP] Japan .............................. 52-19389[U]

[51] Int. Cl.² .......................... B65H 75/26; B29F 1/00
[52] U.S. Cl. ................................. 242/68.5; 242/74.1; 249/122; 264/328; 425/542
[58] Field of Search ................... 242/74, 74.1, 68.5, 242/68.6, 71.8, 1; 425/542, 567, 573; 249/122; 264/328, 276

[56] References Cited

U.S. PATENT DOCUMENTS

| 2,400,024 | 5/1946 | Roehrl | 264/328 X |
| 3,243,490 | 3/1966 | Ulmschneider | 264/328 |
| 3,686,470 | 8/1972 | Stahlberg et al. | 242/74 X |
| 3,848,310 | 11/1974 | Steinback | 242/71.8 X |
| 3,995,008 | 11/1976 | Spiegelberg | 264/328 |

*Primary Examiner*—Harvey C. Hornsby
*Assistant Examiner*—John M. Jillions
*Attorney, Agent, or Firm*—Birch, Stewart, Kolasch & Birch

[57] ABSTRACT

The present invention is directed to a hub for use in a tape casette for winding a recording tape around the periphery of the cylindrical surface. The hub includes a drive shaft inserting hole at the center portion thereof; a notch for fastening the end of the recording tape in association with a tape securing member on the peripheral cylindrical surface; a first and a second surface opposed to each other, each surface having an inner annular surface and an outer annular surface; and a resin injection gate surrounded by a concave recess located in the outer annular surface of the first surface. In addition, the present invention includes a recess formed on the outer annular surface of the second surface at a position opposite to the resin injection gate, the bottom face of the recess being substantially parallel to the outer annular surface of the second surface.

6 Claims, 6 Drawing Figures

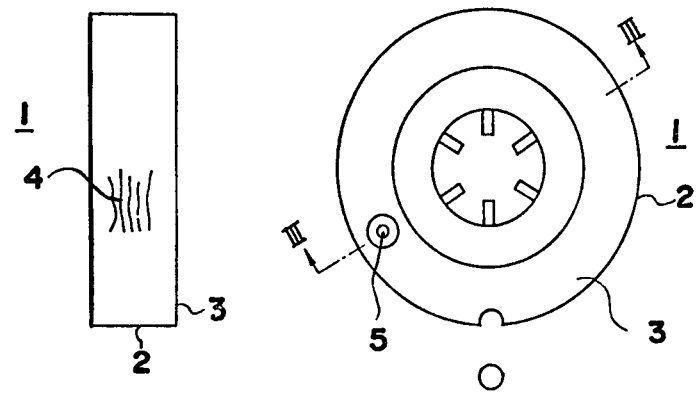
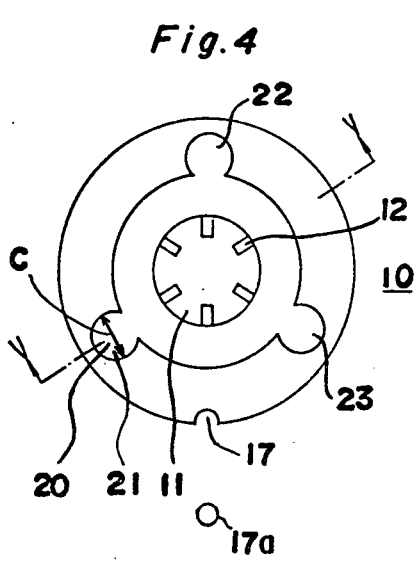
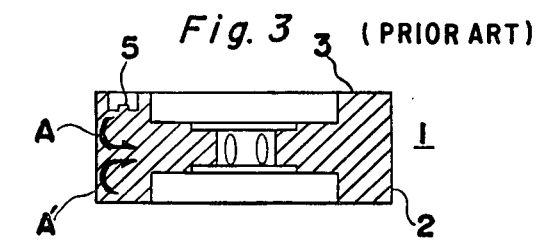
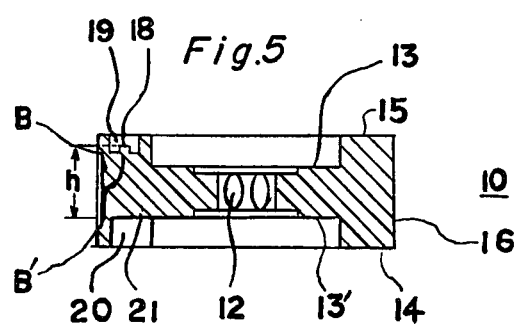
Fig. 2 (PRIOR ART)   Fig. 1 (PRIOR ART)
Fig. 3 (PRIOR ART)
Fig. 4
Fig. 5

HUB FOR USE IN A TAPE CASETTE

BACKGROUND OF THE INVENTION

1. Field of the Invention

The present invention relates to a hub for use in a tape casette, more particularly to a hub having an improved cylindrical surface on which a magnetic recording tape is wound.

2. Description of the Prior Art

It is well known that a hub, as shown in FIG. 1 to FIG. 3 for a tape casette is molded in a body using synthetic resin material such as polyacetal or nylon. In order to obtain a higher surface precision on the outer peripheral surface 2 on which a recording tape is to be wound, the synthetic resin material is injected into a mold through an injection port located on the mold at the position which corresponds to the upper outer annular surface 3 of the hub 1.

As illustrated in FIG. 2, crease-like hollows or wrinkles 4 are apt to appear on the outer peripheral surface 2 in the vicinity of the resin injecting gate 5. The hollows or wrinkles are formed by the flow of synthetic resin injected through an injection port located in the mold assemblies available in the prior art. When a recording tape is wound onto a hub 1 having such a crease-like hollow 4, it results in a crease-like deformation on the recording tape thereby causing distortion of the output reproduced by the recording tape.

The present inventor, as a result of studies directed to the cause of the formation of the crease-like hollow 4, has found that in the early stage of injecting the melted synthetic resin into a mold that some portions of the resin injected in the radial direction of the hub 1 flow as shown by arrows A, A' in FIG. 3. The portions of the resin flow A and A' meet one another at about the center of the axial direction of the hub 1 thereby causing a hollow to form around the central portion near the injection gate 5 on the outer peripheral surface 2.

Even though the hollow is gradually filled with the injected resin, ultimately the hollow remains in the form of one or more creases on the periphery surface 2 of the hub 1.

SUMMARY OF THE INVENTION

The present invention has been developed on the basis of the above finding. It is an object of the present invention to provide a hub for use in a tape casette having a smooth surface on the outer periphery thereby eliminating the crease-like hollow which results in distortion of the output reproduced by the recording tape. According to the present invention it is possible to suppress the formation of creases by forming a recess on the lower outer annular surface of the hub at a position opposite to the resin injection gate located on the upper surface of the hub in order to modify the flow of the injected synthetic resin.

Further scope of applicability of the present invention will become apparent from the detailed description given hereinafter. However, it should be understood, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

A preferred embodiment of the present invention will be illustrated hereinafter in reference to the attached drawings, wherein:

FIG. 1 is a plan view of a conventional hub for use in a tape casette;

FIG. 2 is a side view of the hub shown in FIG. 1;

FIG. 3 is a cross-sectional view of the hub taken along line III—III in FIG. 1;

FIG. 4 is a plan view of a hub according to the present invention;

FIG. 5 is a cross-sectional view of the hub taken along line V—V in FIG. 4; and

DETAILED DESCRIPTION OF THE INVENTION

Figure 6:
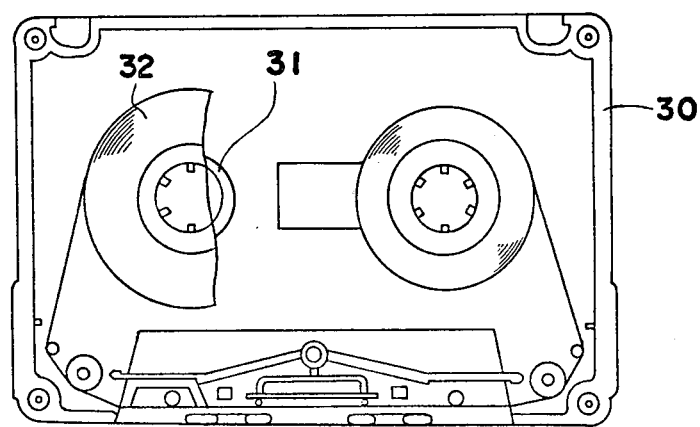
FIG. 6 is a plan view of a tape casette.

Referring to FIGS. 4 to 6, a circular hub 10 for a tape casette is shown. The hub 10 is formed in a body with a synthetic resin material such as polyacetal or nylon by injection molding.

The hub 10 includes a drive shaft inserting hole 11 at the center thereof to accommodate the drive shaft of a tape recorder (not shown) positioned around the inserting hole 11 are a plurality of engaging teeth 12. In addition, around the drive shaft inserting hole 11 are positioned inner annular surfaces 13, 13' which are respectively stepped down from the plane of the upper and the lower outer flat annular surfaces 15 and 14 of the hub 10. The inner annular surfaces 13, 13' engage the rotor table receiving rings 31 of a tape casette 30 (FIG. 6) to ensure that the hub 10 is retained in its position in the tape casette 30.

On the outer cylindrical peripheral surface 16 of the hub 10 on which a magnetic recording tape 32 is wound, a circular notch 17 is provided for fastening the end of the recording tape. The end of the recording tape is engaged by a pin 17a molded from a synthetic resin such as polyethylene or polypropylene into the notch 17, thereby fastening the end of the recording tape to the hub 10. A resin injection gate 18 is provided on the upper flat annular surface 15. A circular concave recess 19 surrounds the resin injection gate 18 to prevent the resin injection gate 18 from protruding beyond the plane of the upper annular surface 15 of the hub 10.

A recess 20 is formed on the bottom outer annular surface 14 at the position opposite to the resin injection gate 18. The bottom face 21 of the recess 20 is aligned to nearly the same plane as the bottom inner annular surface 13' of the hub 10.

Therefore, during the process of the molding the hub, portions of the resin injected in the radial direction of the hub 10 flow in the direction shown by arrow B, B' in FIG. 5 so as to divide the resin flow into an upper flow and a lower flow in the axial direction of the hub 10 along the outer peripheral surface 16.

According to the present invention, since the bottom face 21 of the recess 20 is parallel to the lower surface 14, the amount of the resin flowing in the lateral direction increases and the bottom face 21 acts to facilitate the dividing of the flowing of the resin.

Thus the flow of resin as illustrated by arrows A, A' in FIG. 3 which result in the formation of creases on the outer peripheral surface of the hub are suppressed. Therefore a hub having a desirably smooth surface on the outer peripheral surface 16 can be provided.

It is not necessary that the recess 20 be perfectly aligned in the same plane as the bottom inner annular surface 13' of the hub 10 but it must be slightly dented from the plane of the bottom outer annular surface 14 to change the flow of injected resin in a way as described above. However, when the bottom face 21 of the recess 20 is formed on nearly the same plane as the bottom inner annular surface 13' of the hub 10, the uniform flow of the resin in the direction of the outer peripheral surface is facilitated so as to provide a more desirable result. Further, when the bottom face 21 of the recess 20 is located at a position opposite to and nearly parallel to the bottom face of the concave recess 19, the flow of the resin injected from the resin injection gate is modified so as to divide the flow of resin into an upper flow and a lower flow in the axial direction of the hub 10 from around the central area of the outer peripheral surface 16, thereby obtaining the desired effect.

The size of the bottom face 21 of the recess 20 may vary depending on the distance (h) between the resin injection gate 18 and the bottom face 21 of the recess 20 and the size of the injection gate. For example, when the diameter of the injection gate 18 is about 1 mm and the distance (h) is 2 to 3 mm, the recess 20 may be circular and about 5 mm in diameter (C).

When the size of the bottom face 21 of the recess 20 is equal to or larger than the size of the bottom face of the concave recess 19, desirable results can be obtained.

In order to modify the flow of resin to form a hub, it is desirable that the bottom face 21 of the recess 20 is large in size. On the other hand, when the size of the bottom face 21 is smaller, the mechanical strength of the hub is higher. While the resin injected into a mold flows conically, the plane cross section of the flow of resin generally forms a circle. Therefore, it is preferred that the shape of the bottom face 21 of the recess 20 is a circle in order to modify the flow of resin effectively without lowering the mechanical strength of the hub.

The formation of a recess 20 on the bottom outer annular surface 14 as above, is apt to result in an unbalanced condition of the hub 10 thereby making its rotation unstable. Therefore, it is preferred to form an additional recess in nearly the same shape as the recess 20 so as to divide the bottom annular surface 14 equally into at least two sections, for example, to divide the bottom annular surface 14 nearly equally into three sections by recesses 22 and 23, as shown in FIG. 4.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hub for use in a tape cassette for winding a recording tape, said hub comprising:
    a cylindrical body on which a recording tape is wound;
    a first outer annular surface formed on one end of said cylindrical body;
    a first inner annular surface formed coaxially with said first outer annular surface and being stepped inwardly from said first outer annular surface;
    a second outer annular surface formed on an opposite outer end of the cylindrical body to the first outer annular surface;
    a second inner annular surface formed on an opposite inner annular surface to the first inner annular surface and being stepped inwardly from the second outer annular surface;
    a drive shaft inserting hole defined at the center portion of the hub;
    a notch defined in the cylindrical body for fastening the end portion of the recording tape in association with a tape securing member adapted to fit into the notch;
    a resin injection gate surrounded by a first concave recess defined in the first outer annular surface; and
    a second concave recess formed on the second outer annular surface at a position opposite to the resin injection gate, the bottom face of the second concave recess being substantially parallel to the second inner annular surface.

2. A hub for use in a tape cassette according to claim 1, wherein the bottom face of said second concave recess is at least equal in size to the bottom face of the first concave recess.

3. A hub for use in a tape cassette according to claim 1, wherein the bottom face of said second concave recess is formed on nearly the same plane level as that of the second inner annular surface of the hub.

4. A hub for use in a tape cassette according to claim 1, wherein said second concave recess is formed in an arcuate shape.

5. A hub for use in a tape cassette according to claim 1, wherein said second outer annular surface comprises at least an additional recess being substantially similar to the second concave recess and being located in such a position as to divide the second outer annular surface into at least two sections.

6. A hub for use in a tape cassette according to claim 1, wherein said first outer annular surface, said first inner annular surface, said second outer annular surface and said second inner annular surface are generally flat.

* * * * *